United States Patent
Gomez et al.

(10) Patent No.: US 7,386,415 B2
(45) Date of Patent: Jun. 10, 2008

(54) SYSTEM AND METHOD FOR INCREASING SENSOR RESOLUTION USING INTERPOLATION

(75) Inventors: Daniel H. Gomez, Fremont, CA (US); Danny Grant, Montreal (CA); Kollin M. Tierling, Milpitas, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 11/179,067

(22) Filed: Jul. 12, 2005

(65) Prior Publication Data

US 2006/0025959 A1 Feb. 2, 2006

Related U.S. Application Data

(60) Provisional application No. 60/587,384, filed on Jul. 12, 2004, provisional application No. 60/610,311, filed on Sep. 16, 2004.

(51) Int. Cl.
*G01P 3/00* (2006.01)

(52) U.S. Cl. ..................... 702/145; 702/151

(58) Field of Classification Search ............... 702/142, 702/151
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Salsbury | |
| 4,236,325 A | 12/1980 | Hall et al. | |
| 4,513,235 A | 4/1985 | Acklam et al. | |
| 4,535,405 A * | 8/1985 | Hill et al. | ..................... 700/90 |
| 4,581,491 A | 4/1986 | Boothroyd | |
| 4,599,070 A | 7/1986 | Hladky et al. | |

(Continued)

FOREIGN PATENT DOCUMENTS

EP         0349086         1/1990

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—John E Barlow, Jr.
*Assistant Examiner*—Jonathan Moffat
(74) *Attorney, Agent, or Firm*—Kilpatrick Stockton LLP

(57) ABSTRACT

Systems and methods for increasing sensor resolution using interpolation are described. One described method includes receiving an analog sensor signal associated with a coding surface; deriving a quadrature signal based at least in part on an analog threshold voltage associated with the analog sensor signal; determining a velocity and a derived quadrature position of the coding surface based at least in part on the quadrature signal; outputting the derived quadrature position of the coding surface if the velocity exceeds a velocity threshold; and determining and outputting an interpolated position of the coding surface using analog interpolation if the velocity is less than or equal to the velocity threshold.

25 Claims, 8 Drawing Sheets

U.S. PATENT DOCUMENTS

| | | | |
|---|---|---|---|
| 4,708,656 A | 11/1987 | De Vries et al. | |
| 4,713,007 A | 12/1987 | Alban | |
| 4,742,332 A * | 5/1988 | Schroeder et al. | 341/15 |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,130,631 A * | 7/1992 | Gordon et al. | 318/568.11 |
| 5,186,695 A | 2/1993 | Mangseth et al. | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,299,810 A | 4/1994 | Pierce | |
| 5,309,140 A | 5/1994 | Everett | |
| 5,334,027 A | 8/1994 | Wherlock | |
| 5,466,213 A | 11/1995 | Hogan | |
| 5,547,382 A | 8/1996 | Yamasaki | |
| 5,766,016 A | 6/1998 | Sinclair | |
| 5,785,630 A | 7/1998 | Bobick et al. | |
| 6,111,577 A | 8/2000 | Zilles et al. | |
| 6,219,034 B1 | 4/2001 | Elbing et al. | |
| 6,422,941 B1 | 7/2002 | Thorner et al. | |
| 6,556,153 B1 * | 4/2003 | Cardamone | 341/111 |
| 6,564,168 B1 * | 5/2003 | Hasser | 702/163 |
| 6,704,683 B1 * | 3/2004 | Hasser | 702/147 |

FOREIGN PATENT DOCUMENTS

| | | |
|---|---|---|
| EP | 0 358 989 B1 | 7/1994 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System." 1050-4729/93, pp. 955-960, 1993.

"Cyberman Technical Specification," Logitech Cyberman Swift Supplement, Apr. 5, 1994.

Eberhardt et al., "OMAR—A Haptic display for speech perception by deaf and deaf-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback." vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge. Sep. 8-11, 1994.

Mcaffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking." Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition: McGraw-Hill, ISBN 0-07-050167-X, pp. 41-202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute. Sep. 30-Oct. 1, 1992.

Snow et al., "Model-X Force-Reflecting-Hand-Controller," NT Control No. MPO-17851; JPL Case No. 5348. pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in A Computer Mouse," Proceedings of Fourteenth Annual Northeast Bioengineering Conference, University of New Hampshire, Mar. 10-11, 1988.

PCT Search Report issue By European Searching Authority for PCT/US2005/024619 mailed Jul. 12, 2005.

Morgan, D. "Quadrature-Encoded Position and Beyond," Embedded System Design, www.embedded.com/shared/printableArticle.jhtml, Feb. 28, 2001, as printed Feb. 2, 2007.

* cited by examiner

SYSTEM AND METHOD FOR INCREASING SENSOR RESOLUTION USING INTERPOLATION

RELATED APPLICATION

This application claims priority to Application Ser. No. 60/587,384, filed Jul. 12, 2004, titled "Systems and Methods for Increasing Sensor Resolution Using Interpolation," and application Ser. No. 60/610,311, filed Sep. 16, 2004, titled "Systems and Methods for Increasing Sensor Resolution Using Interpolation," the entirety of both of which are incorporated herein by reference.

FIELD OF THE INVENTION

The present invention generally relates to motion sensing. This invention more particularly relates to systems and methods for increasing sensor resolution using interpolation.

BACKGROUND

A conventional input device, such as a mouse, knob, or other manipulandum, may use one or more optical or other sensors to sense movement of the device. Many conventional input devices are relatively inexpensive; the components of the device, including the sensors, are correspondingly inexpensive. However, inexpensive sensors typically provide relatively low resolution of the movement of the device. While the low resolution provided by these sensors may be acceptable for accepting input from a mouse or knob and affecting, for example, cursor movement, some implementations require higher resolution. For example, providing compelling haptic effects may require higher resolution.

High-resolution sensors provide the resolution desired for providing compelling haptic effects and other uses, but are generally more expensive. The increase in cost may be due, for example, to an increased number of, or more exacting standards for, the components in the sensor. Higher resolution may also be achieved by utilizing additional low-cost sensors. But again, a higher cost accompanies the higher resolution. Also, there may be physical limitations to adding additional sensors.

SUMMARY

An embodiment of the present invention provides a system and method for increasing sensor resolution using interpolation. One embodiment of the present invention implements a method comprising: receiving an analog sensor signal associated with a coding surface; deriving a quadrature signal based at least in part on an analog threshold voltage associated with the analog sensor signal; determining a velocity and a derived quadrature position of the coding surface based at least in part on the quadrature signal; outputting the derived quadrature position of the coding surface if the velocity exceeds a velocity threshold; and determining and outputting an interpolated position of the coding surface using analog interpolation if the velocity is less than or equal to the velocity threshold. In another embodiment, a computer-readable medium (such as, for example random access memory or a computer disk) comprises code for carrying out such a method.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
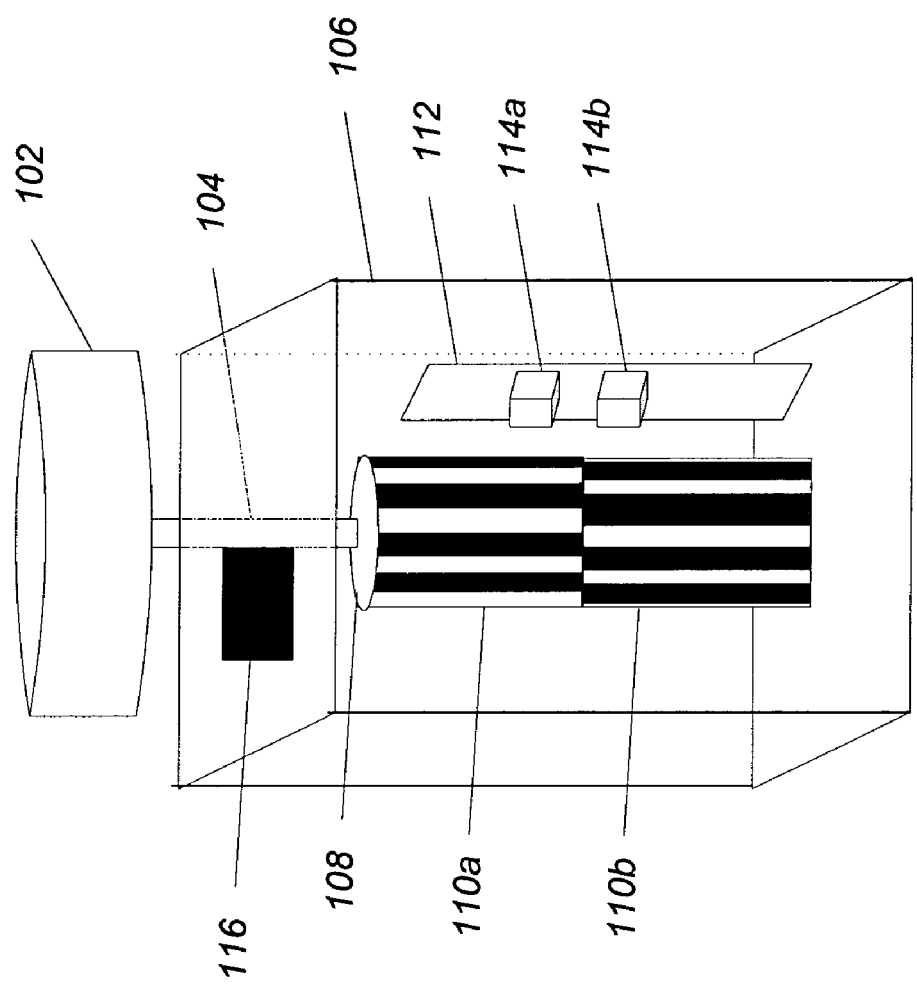
FIG. 1 is an illustrative environment for implementation of one embodiment of the present invention.

Embodiments of the present invention provide systems and methods for increasing sensor resolution using interpolation. In an illustrative embodiment, a sensor is configured to sense the motion of a knob and generate a sensor signal and a quadrature signal. The sensor comprises two phototransistors that are configured to sense the motion of a black and white label affixed to a drum, which is mounted on the shaft of the knob. The phototransistors are ninety degrees out of phase and each produce a semi-sinusoidal signal corresponding to the amount of light reflecting off of the label.

The label includes eight white segments and eight black segments. Each of the segments is of approximately equal width. In other words, each label accounts for approximately 22.5 degrees of the circumference of the drum. The white segments are referred to as apertures.

A processor in communication with the sensor is configured to receive the sensor signal and the quadrature signal. The sensor signal comprises two semi-sinusoidal signals corresponding to the two phototransistors. Each aperture has four quadratures.

When the knob is rotated, the processor receives the sensor signal and the quadrature signal. The processor executes an arc tangent 2 (ATAN2) function on the sensor signal to determine an interpolated position of the disk within the aperture. Based on this determination, the processor interpolates the position of the sensor in relation to the aperture of the coding disk. For example, the processor may determine that the sensor at a point that is approximately 4.5 degrees into the aperture, i.e., 20% of the 22.5 degrees of the total aperture width.

The processor then determines which aperture is being sensed based on the quadrature signal. For instance, if the quadrature signal is 1 through 4, the sensor is sensing the first aperture. If the quadrature signal is 5 through 8, the sensor is sensing the second aperture.

Once the processor has determined which aperture is being sensed and has determined the interpolated position within the aperture, the processor adds these two positions together to determine the interpolated position of the coding disk.

For example, the processor receives a quadrature signal equal to 2. The processor also determines that the interpolated position within the aperture is 4.5 degrees. From these two determinations, the processor determines that the sensor is sensing the first aperture. Thus, the interpolated position of the coding disk is 4.5 degrees from the origin of the coding disk.

The interpolated position can then be used as input to software. For instance, the interpolated position can be used to adjust a parameter, such as the volume, of a handheld phone or an automotive stereo. In one embodiment, the interpolated position is used to determine the appropriate haptic feedback to be provided to the knob.

This introduction is given to introduce the reader to the general subject matter of the application. By no means is the invention limited to such subject matter. Illustrative embodiments are described below.

Example Hardware Environments

FIG. 1 illustrates an environment for implementation of one embodiment of the present invention. In the embodiment shown, a knob 102 is affixed to a shaft 104. The shaft passes through a housing 106. Inside the housing is a cylindrical drum 108. The cylindrical drum 108 is coupled to the shaft 106 so that when the knob 102 is rotated, the shaft 106 and drum 108 rotate as well. The cylindrical drum shown is approximately eight mm in circumference. Any size drum may be used.

Affixed to the drum are two stickers 110a, b. Each of the stickers comprises 8 black segments and 8 white segments. The stickers are offset from one another by half a segment. In other words, a white segment of one sticker begins at the mid-point of a white segment of the second sticker, and each segment covers approximately 22.5 degrees of the circumference of the drum 108. The white segments may be referred to as apertures.

An aperture is a slit or opening in a coding wheel, disk, drum, or other coding surface that allows light from an emitter to pass through or a segment of color on a coding surface that reflects the light from an emitter. The width of the aperture corresponds to a full cycle of the resolver signals.

Quadrature signals are the digital version of the resolver signals. The ideal quadrature signal is 1 when the corresponding resolver signal is positive and zero otherwise.

Other embodiments may utilize different configurations. For example, in one embodiment, a linear motion sensor is utilized. The linear sensor senses movement of a linear surface that comprises apertures, which may be, for example, holes or markings similar to those described in relation to the drum 108 above.

The housing 102 also contains a printed circuit board (PCB) 112. The PCB 112 includes a variety of components (not shown). Included on the PCB 112 is a pair of infrared (IR) sensors 114a, b. The IR sensors 114a, b are operable to reflect light off of the stickers 110a, b and detect the reflected light.

The sensor generates a pair of analog signals (A,B), which may be referred to as analog channels. In the embodiment shown, these signals are periodic and quasi-sinusoidal with constant relative phase of about ¼ of a cycle.

In the embodiment shown in FIG. 1, the IR sensors 114a, b are aligned with one another. However, since the stickers 110a, b are offset, the magnitude of the reflected light detected by each of the IR sensors 114a, b will differ. In one embodiment of the present invention, the phase offset of the reflected light may be used to interpolate a position within the white segments, providing a more accurate determination of the position of the cylinder 108 and of the knob 102.

In the embodiment shown in FIG. 1, an actuator 116 is in communication with the shaft 104. The actuator 116 is operable to impart a haptic effect on the shaft 104 and the knob 102 based on output from a processor (not shown). For example, the processor may receive a signal sensors 114a, b indicating movement of the knob 102. In response, the processor determines an actuator signal to provide to the actuator 116 to impart an appropriate haptic effect. The actuator 116 receives the signal and exerts a force on the shaft 104. The actuator 116 may be any type of actuator capable of imparting a haptic effect on the shaft 104. The example, the actuator may comprise a motor or brake.

Various devices may comprise the housing 106 of the embodiment shown in FIG. 1. For instance, in one embodiment, the housing is part of an industrial application in an appliance, such as a dishwasher. In another embodiment, the housing is part of the structure in an automobile, such as the center console. The housing 106 may also be, for example, the housing of a cell phone, Personal Digital Assistant (PDA), MP3 player, or some other personal electronic device. In some embodiments, a self-contained haptic input device comprises the elements shown in FIG. 1. Such an input device may be utilized in a variety of implementations.

Figure 2:
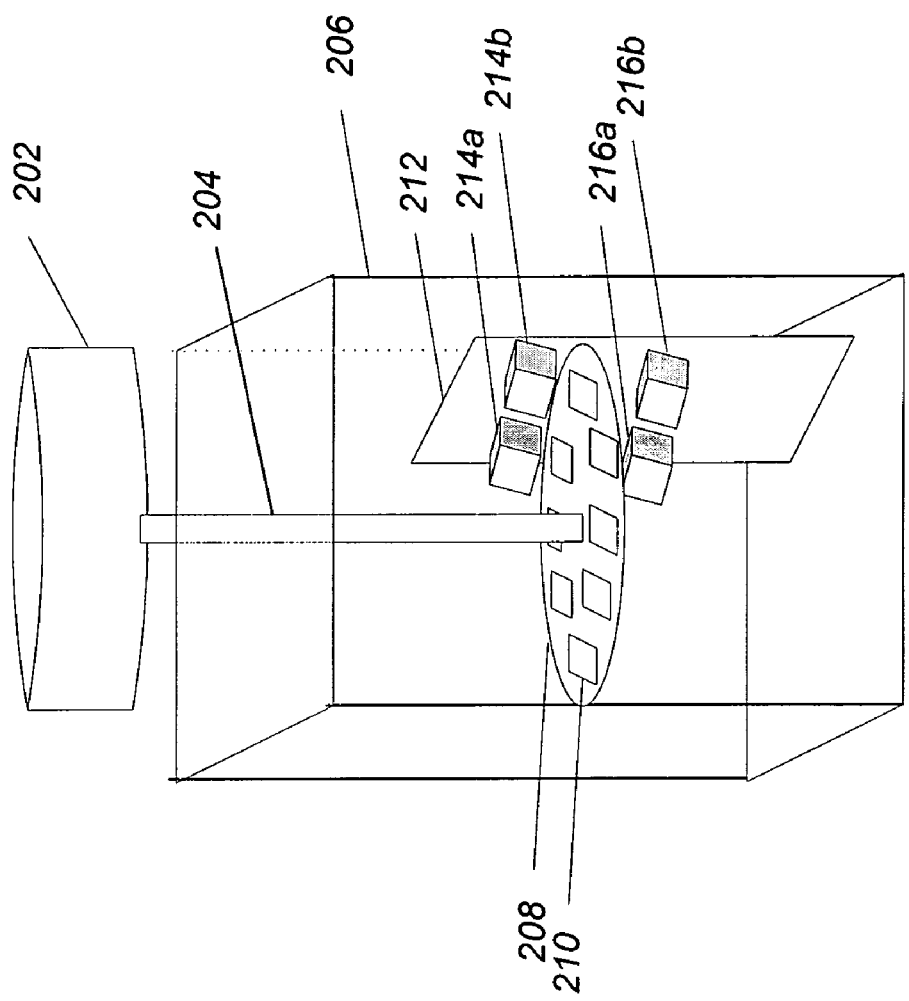
FIG. 2 illustrates an alternate environment for implementation of one embodiment of the present invention.

FIG. 2 illustrates an alternate environment for implementation of one embodiment of the present invention. In the embodiment shown, a knob 202 is affixed to a shaft 204. The shaft passes through a housing 206. Inside the housing is a disk 208. The disk 208 is coupled to the shaft 204 so that when the knob 202 is rotated, the shaft 204 and disk 208 rotate as well. The disk comprises eight apertures, including aperture 210, that are substantially equally spaced.

The housing 202 also contains a printed circuit board (PCB) 212. The PCB 212 includes a variety of components (not shown). Included on the PCB 212 are two emitter-detector pairs 214, 216. The detectors 216 shown comprise phototransistors. The emitter-detector pairs 214, 216 are offset. The offset of the emitter-detector pairs causes a phase offset between the signals generated by detector 216a and detector 216b. The phase offset between the two detectors 216a, b may be used to interpolate a position within each of the apertures, providing a more accurate determination of the position of the disk 208 and of the knob 202. In one embodiment, a single emitter and two detectors are utilized. The printed circuit boards shown in FIGS. 1 and 2 each comprises, or is in communication with, a processor (not shown). The sensors provide signals to the processor, which, in turn, is in communication with a computer-readable medium, e.g., a memory. The processor executes computer-executable program instructions stored in memory, such as in firmware, for interpolating a position based on a sensor signal. Such processors may comprise a microprocessor, an Application-specific Integrated Circuit (ASIC), a state machine, or other processor. Such processors comprise, or may be in communication with, media, for example computer-readable media, which stores instructions that, when executed by the processor, cause the processor to perform the steps described herein.

Embodiments of computer-readable media may comprise an electronic, optical, magnetic, or other storage or transmission device capable of providing a processor with computer-readable instructions. Other examples of suitable media may comprise a floppy disk, Compact Disk Read Only Memory (CD-ROM), magnetic disk, memory chip, Read Only Memory (ROM), Random Access Memory (RAM), an ASIC, a configured processor, all optical media, all magnetic tape or other magnetic media, or any other suitable medium from which a computer processor can read instructions or on which instructions, code, or other data may be stored. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The processor may be in communication with any number of other external or internal devices such as a mouse, a CD-ROM, a keyboard, a display, or other input or output devices.

Figure 3:
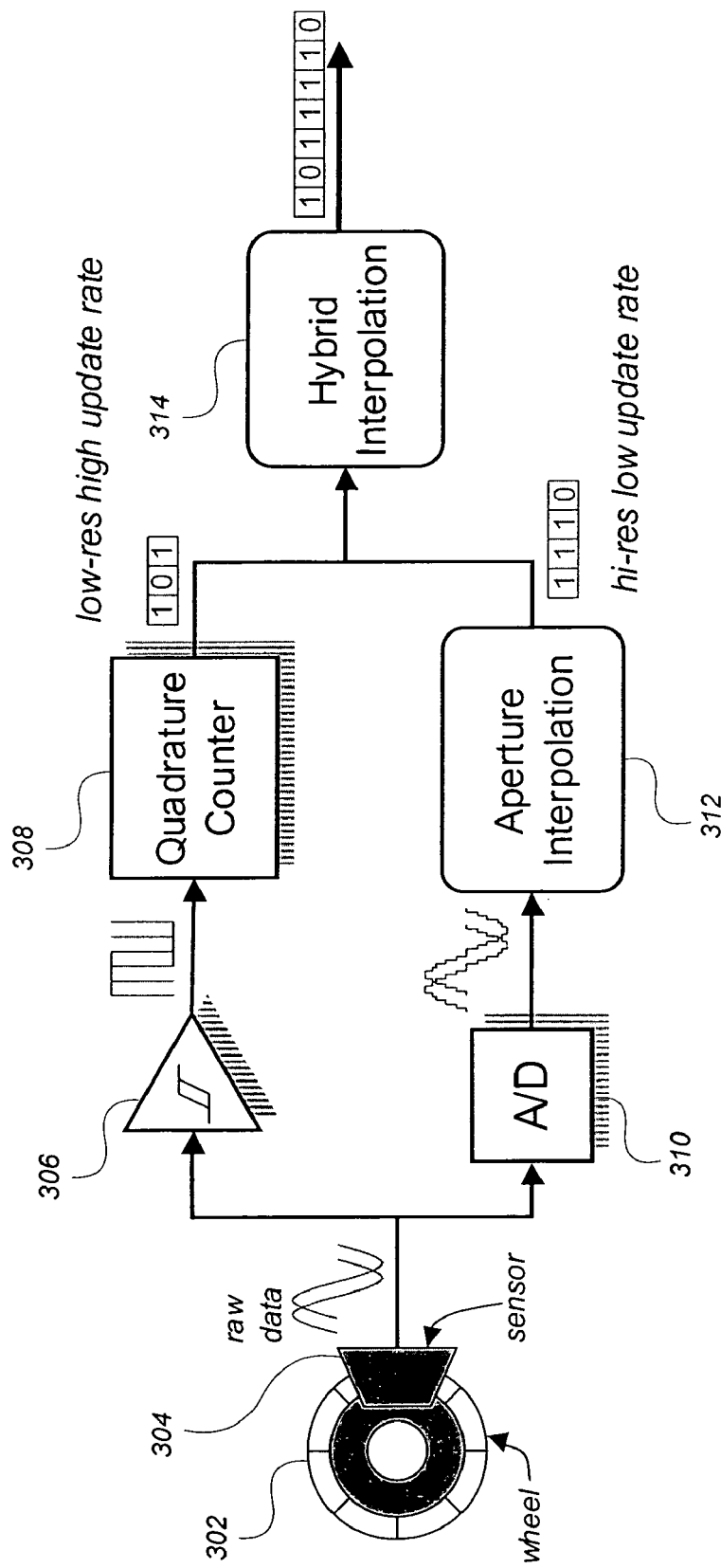
FIG. 3 is a block diagram of one embodiment of the present invention for performing hybrid interpolation.

FIG. 3 is a block diagram of one embodiment of the present invention for performing hybrid interpolation. The embodiment shown in FIG. 3 comprises a coding wheel 302. Motion of the wheel 302 is sensed by sensor 304. Various configurations of the coding wheel 302 and sensor 304 may be utilized, and two such embodiments are described above in relation to FIGS. 1 and 2.

The sensor 304 outputs raw data. The sensor 304 is a low-cost sensor, which generates semi-sinusoidal signals. More costly sensors generate more accurate sinusoidal signals. An embodiment of the present invention may utilize a high-cost sensor, however, embodiments of the present invention are able to provide high resolution using low-cost sensors. The raw data comprises a pair of semi-sinusoidal signals that are out of phase, e.g., ninety degrees out of phase.

The raw signals are passed to a voltage comparator 306. The comparator in FIG. 306 is a single bit A/D converter times two channels to derive a quadrature signal. The A/D converter consists of a comparator with a small feedback hysteresis. A single reference voltage is used in the comparator in order for the derived 2 bit quadrature signal to be highly correlated to the analog signal with higher precision. A/D converters used for the more precise interpolation normally output a reference voltage that is in the middle of its comparison range. This voltage should be used as the reference voltage for the derived quadrature circuit for optimal correlation to the higher precision A/D signal. Alternatively the most significant bit of each of the A/D inputs may serve as the derived quadrature signal. The output of the comparator 306 is either on or off (i.e., 1 or 0), depending on the raw signals generated by the sensor 304. The output of the comparator 306 is used by a quadrature counter 308 to determine a low-resolution position of the wheel 302 within a particular aperture.

Quadratures are the subdivisions of the aperture generated by the rising and falling edges of the quadrature signals. There are four quadratures per aperture. In some embodiments, due to irregularities in the quadrature signals and voltage trigger levels, the quadratures do not have uniform spacing.

Based on output from the quadrature counter 308, a processor (not shown) can determine the current aperture of the coding wheel and a relative position within the aperture. However, the position within the aperture is only one of four potential positions.

In the embodiment shown in FIG. 3, an analog-to-digital (A/D) converter 310 also receives the raw signals. An aperture interpolation algorithm 312 determines a high-resolution interpolated position within the aperture. A hybrid interpolation algorithm 314 then utilizes the low and high-resolution position information to determine an interpolated position to output. One method of hybrid interpolation is described below in relation to FIG. 4.

In the embodiment shown in FIG. 3, the elements portrayed with sharp corners are implemented with hardware, i.e., the voltage comparator 306, quadrature counter 308, and analog-to-digital converter 310. The elements portrayed with rounded corners are implemented with software. In other embodiments, the various elements may be implemented with differing combinations of software and/or hardware.

Figure 4:
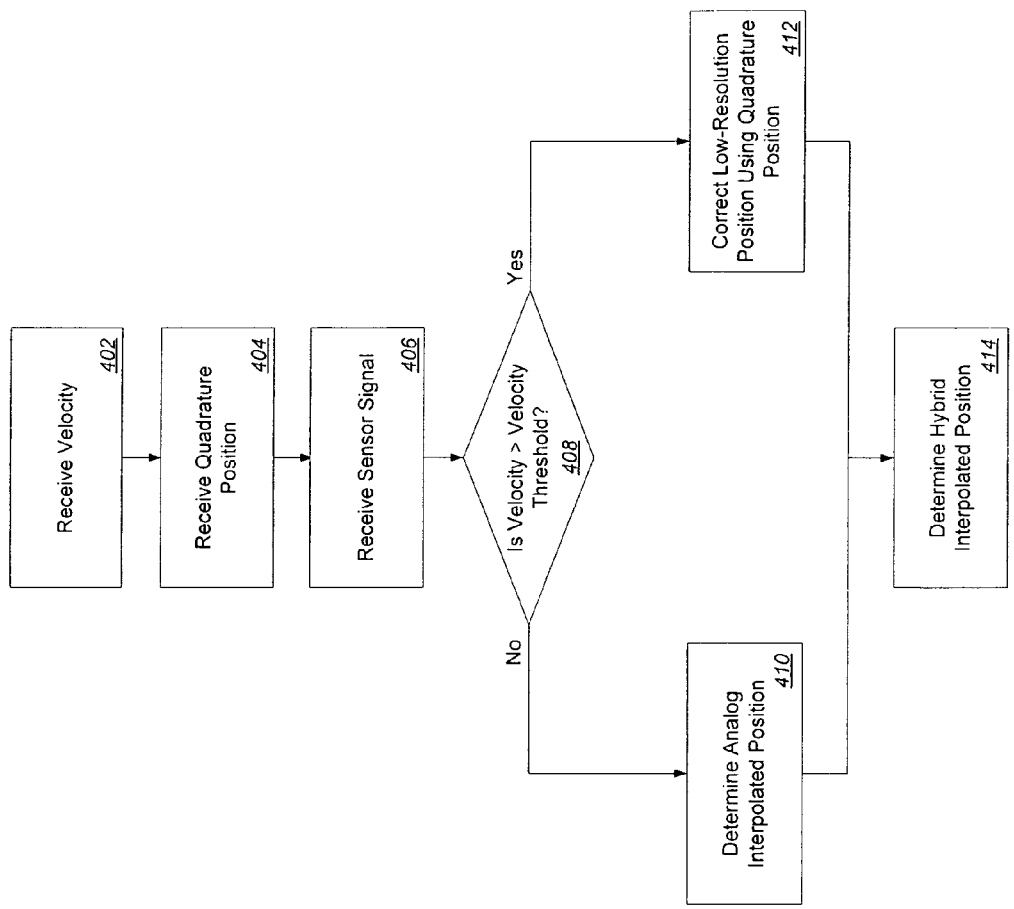
FIG. 4 is a flowchart illustrating a process for hybrid interpolation in one embodiment of the present invention.

FIG. 4 is a flowchart illustrating a process for hybrid interpolation in one embodiment of the present invention. In the embodiment shown, a processor receives a velocity measure (v) 402. The velocity measure corresponds to the speed of rotation of the coding wheel 302.

The processor also receives a quadrature position 404. The processor also receives the sensor signal 406. The processor then compares the velocity measure (v) to a velocity threshold ($v_c$) 408.

In one embodiment of a DAI (Direct Analog Interpolation) algorithm, the exact detection of aperture transitions via analog signal requires at least two samples per aperture. Therefore, for a given sample rate S and aperture resolution A, there is a threshold velocity $v_c$ given by:

$$v_c = S/2A \text{[rev/sec]}$$

At velocities larger than $v_c$, DAI may lose track of aperture counts generating discrete position/velocity errors.

In a typical case, an interpolation sensor with S=1 KHz and A=180 aperture/rev, $v_c$=2.77 rev/sec. This threshold velocity may be momentarily achieved during aggressive detent interaction.

If the velocity measure v is greater than $v_c$, the processor corrects the low-resolution position using the quadrature resolution and ignores the intra-aperture analog interpolated value 412. In such an embodiment, at large velocities, there is no need for full resolution. Also, when moving fast, there may be large position errors associated with the delayed A/D samples; so analog values may be ignored.

If the velocity v does not exceed $v_c$, the processor determines the analog interpolated position 410. The processor then determines the hybrid interpolated position 414. The processor tracks the number of digital quadrature counts in between samples. This quadrature delta is then aligned to analog apertures and used to calculate a correction term for the aperture counts. An embodiment implementing this technique maintains full resolution.

The environments described above are examples of environments according to embodiments of the present invention. Many other environments may be implemented. For example, a variety of devices may incorporate systems and methods according to the present invention, including personal computers, media center computers, televisions, television set-top boxes, digital assistants, personal digital assistants, cellular phones, mobile phones, smart phones, pagers, digital tablets, laptop computers, Internet appliances, and other processor-based devices. In general, any device capable of utilizing a low-resolution encoder to determine the position of a manipulandum (a user manipulatable input device) or other user interface device may implement systems and methods according to the present invention.

Calibration

Figure 5:
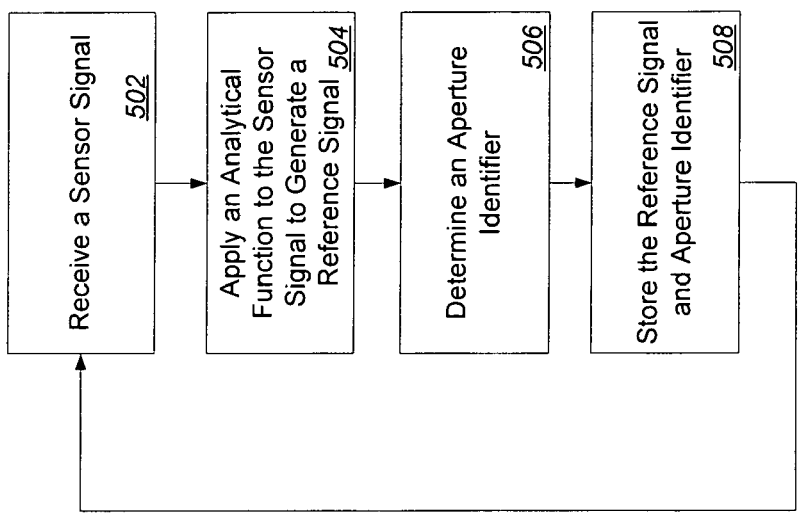
FIG. 5 is a flowchart illustrating a calibration method in one embodiment of the present invention.

In one embodiment of the present invention, a calibration is performed to generate a set of reference signals, which may subsequently be compared to signals received from a sensor. FIG. 5 is a flowchart illustrating a calibration method in one embodiment of the present invention. In the embodiment shown, a low-resolution sensor is configured to sense the rotation of a shaft of a knob. The sensor comprises two optical emitter/detector pairs. Each of the emitter/detector pairs is aligned so that the emitter emits light through an encoder disk; the detector detects the light passing through the disk. As the disk moves, the amount of light detected by the detector rises and falls based on the extent to which the slot in the encoder disk is aligned with the emitter/detector pair. In other words, if the center of the slot is aligned with the center of the emitter/detector pair, the detector will detect the maximum amount of light. If the center of a portion of the disk between two slots is aligned with the center of the emitter/detector pair, the detector will detect the minimum amount of light. The maximum and minimum amount of light corresponds to a minimum and maximum voltage that is output by the detector.

The two emitter-detector pairs are configured to sense the movement of a single disk. However, they are offset by ninety degrees. Accordingly, when one detector outputs a minimum voltage, the other detector emits a higher voltage, and when one detector outputs a maximum voltage, the other detector outputs a lower voltage. The offset in voltage provides a means to interpolate a position within the slots of the encoder disk.

To perform the process shown in FIG. 5, the knob is spun at a substantially constant velocity, i.e., the disk spins at a constant velocity. When the disk is spun at a substantially constant velocity, a graph of the voltage emitted by detector over time approximates a sinusoidal curve. A processor receives a sensor signal from the detector 502. The sensor signal may comprise multiple values. For instance, in the embodiments shown in FIGS. 1-3, the sensor signal comprises two sensor values, A and B.

The processor next applies an analytical function to the values in the sensor signal to generate a reference signal, i.e., a value representative of the sensor values 504. For example, in one embodiment, the processor applies an arc tangent 2 (ATAN2) function to the two values. Applying the ATAN2 function to the two values, which are 90 degrees out of phase, results in a plot that approximates a circle for each aperture.

The processor next determines an aperture identifier 506. An aperture identifier identifies a specific aperture on a coding disk. The aperture identifier may comprise, for example, an integer ranging from 1 to the total number of apertures on the disk. The processor may determine the aperture identifier in various ways. For example, the aperture may keep track of the aperture by sensing when the ATAN2 function approaches a minimum value. The phase within the aperture spans from a minimum to a maximum. The minimum value is at the beginning of the aperture, and the maximum value is at the end of the aperture. The aperture identifier may be determined in other ways as well. For example, in one embodiment, a separate sensor provides a signal indicating when an aperture is entered/exited. In yet another embodiment, the sensor provides an optional index signal to identify the aperture (e.g., the Agilent HEDM sensor). The processor tracks the secondary index signal as well as the primary sensor signal described above. Such an embodiment may be utilized, for example, in a case where high speed will be required of the manipulandum.

Once the processor has received the sensor signal 502, applied the analytical function to the sensor signal to generate a reference signal 504, and determined the aperture identifier 506, the processor stores the reference signal and the aperture identifier 508. The process shown in FIG. 5 is repeated for each sensor signal to be stored. The processor may store all of the reference signals and aperture identifiers for all of the apertures on a disk or may store a subset of the apertures. Storing all of the reference signals and aperture identifiers will require greater memory, but may also result in a more accurate interpolation of a position as described in detail below. Alternatively, a single waveform representing an average of all the apertures may be stored. This average waveform may be complemented with one or more aperture specific parameters such as max voltage in a specific aperture or average voltage for the aperture.

Interpolation

Figure 6:
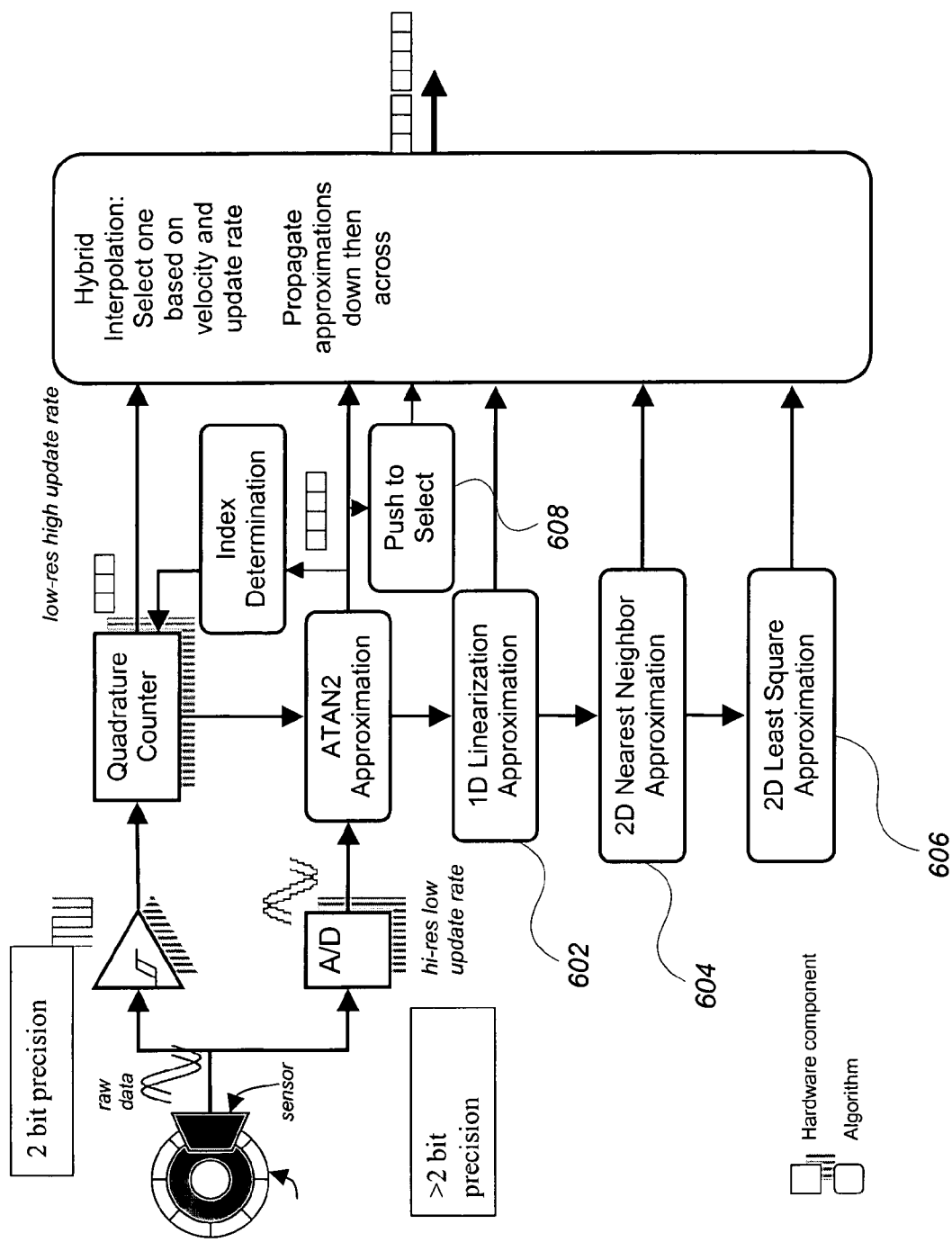
FIG. 6 is a block diagram illustrating various alternative methods of interpolation in one embodiment of the present invention.

FIG. 6 is a block diagram illustrating various alternative methods of interpolation in one embodiment of the present invention. In the embodiment shown, an optical encoder determines rotational position and axial travel by a method that combines information obtained by extracting sensor information with different precisions in order to determine a combined angular position. The precision of the information that is selected to be combined is determined by the rotational velocity of the device and the computational resources available. Various levels of accuracy may be obtained by applying one of approximation methods to the analog data in order to arrive at a position estimate. Each successive approximation increases the computational load of the processor. Additionally, each successive approximation relies on the preceding approximation. In other words, the second approximation relies on the output of the first approximation, and the third approximation relies upon the output of the second approximation. The various approximation methods are described below.

In FIG. 3 above, two precisions are illustrated, the first is a binary precision determined by passing the encoder signal through a comparator to determine if the encoder signal is greater than or less than a reference signal. This binary precision is utilized as the least precise method but has the advantage of being used in conjunction with a quadrature counter in order to determine gross encoder position with hardware only. Gross position is the count corresponding to the current aperture and aperture phase that is underneath the optical sensor. The encoder disk angle is determined by a combination of aperture number or angle and aperture phase. A standard quadrature encoder determines aperture number as the N-2 most significant bits in its position count and aperture phase as the least significant two bits of position.

The second level of precision is obtained by utilizing an analog to digital (A/D) converter to capture the analog values generated by the optical encoder. The precision of the analog data is determined by the precision of the A/D converter. The accuracy of the resulting position is determined by the level of accuracy associated with each of successive positional approximations.

The first positional approximation is arrived at by applying the two raw sensor data values to an ATAN2 function, which generates a first approximation of aperture angle. This approximation is described in relation to FIG. 3 above.

The second positional approximation is determined by applying the position obtained from the ATAN2 approximation to a linearization table 602.

The third positional approximation is a 2-D correlation between the encoder data values A and B and previously captured raw data reference values 604. As this method utilizes correlation values between the newly captured sensor values and a very large set of captured reference values, the correlation approximation requires the previous approximations to narrow down the scope of the correlation search to a neighborhood of reference data points. The third positional approximation resulted in an aperture angle approximation $\theta_{(3)}$ which is then correlated to a raw data index i such that $\theta_{(A,B)} \sim = \theta_{(3)}$.

The two-dimensional approximation utilizes the fact that the phase trajectory contains repeatable data values that are correlated not only to the aperture angle $\theta_{(3)}$ but also to the distance from the centroid of the phase trajectory. These repeatable amplitude artifacts yield additional information that allows for a more accurate estimate of position.

A distance vector is calculated from the new data pair (A,B) to the reference data pair (Ai, Bi) and also for the neighborhood of data pairs $(A_{i-n}, B_{i-n})$, $(A_{i-n+1}, B_{i-n+1})$, ... $(A_{i-1}, B_{i-1})$, $(A_i, B_i)$, $(A_{i+1}, B_{i+1})$, ... up to $(A_{i+n}, B_{i+n})$. shortest distance vector, i.e., the nearest neighbor, is then the closest approximation to the captured data pair and the reference angle associated with the data pair is then taken as an improved approximation to the actual aperture angle.

A further improvement in accuracy may be obtained by taking a 2-D interpolation of a plurality of raw data points (a point cloud) to the new data point 606. This further improvement results in the simple case of two points in the neighborhood of the sample point (A,B) by taking $\theta_{(4)} = \theta_{low} + (\theta_{high} - \theta_{low}) * MSE_{low}/(MSE_{low} + MSE_{high})$.

In the case of two points, this resolves into a simple linear interpolation of distance between the data points $(A_i, B_i)$ and $(A_{i+1}, B_{i+1})$. In the case of more than two data points, the resulting aperture angle is the mean square weighted interpolation angle in the neighborhood of the nearest reference point to $\theta_{(3)}$.

$\theta_{(4)}$ is then the most accurate angular estimate resulting from the series of approximations and is taken as the aperture angle determined by the optimal correlation of sample data pair (A,B) to the set of reference data pairs $(A_i, B_i)$.

Figure 7:
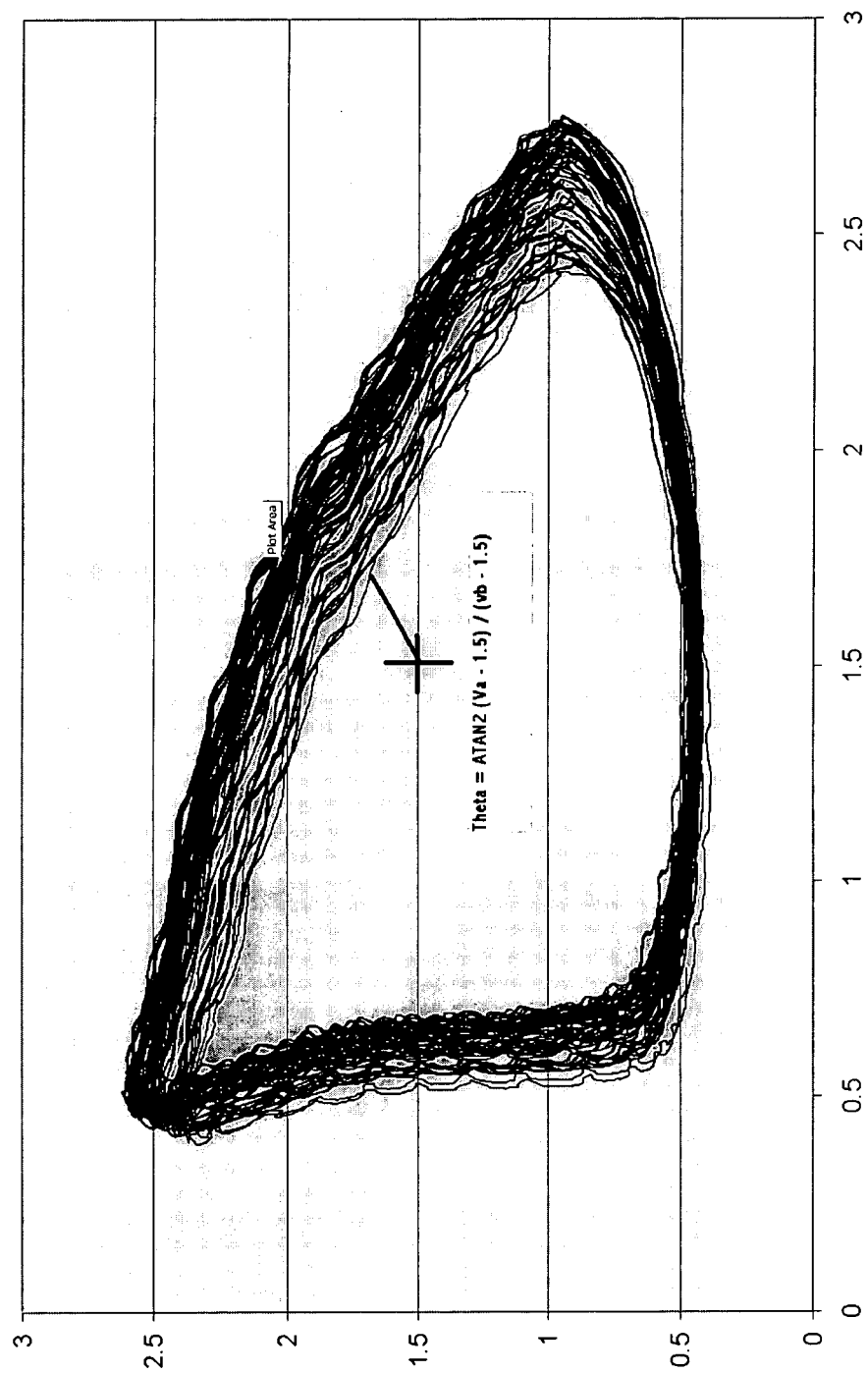
FIG. 7 is a pseudophase plot of all of the apertures of a coding wheel in one embodiment of the present invention.

The 2-D interpolation methods described above rely on a pseudophase plot. The ATAN2 approximation maps a one to one relationship between aperture phase and sensor pseudophase. This method is illustrated in FIG. 7. FIG. 7 is a pseudophase plot of all of the apertures of an encoder disk in one embodiment of the present invention. The data represented plots phase A in the horizontal axis versus phase B in the vertical axis. Each point in the phase plot corresponds to a rotational position of the encoder. As the encoder is rotated, the encoder will describe a path that loops around the closed path, with one loop per aperture. Rotating the encoder disk in the opposite direction results in a closed path that loops in the opposite direction about a reference datum point, say 1.5, 1.5 at the center of the loop.

Since the encoder wheel comprises a large range in aperture sizes and relative location, the plot illustrates a large range of closed loop paths in the pseudophase plot shown in FIG. 7. To attain a higher degree of precision, an embodiment of the present invention examines the closed path (or substantially closed path) corresponding to a single aperture. To do so, the firmware tracks rotational position of the encoder disk and uses an appropriate template image for the aperture that is being sensed.

Axial Position Sensor

Figure 8:
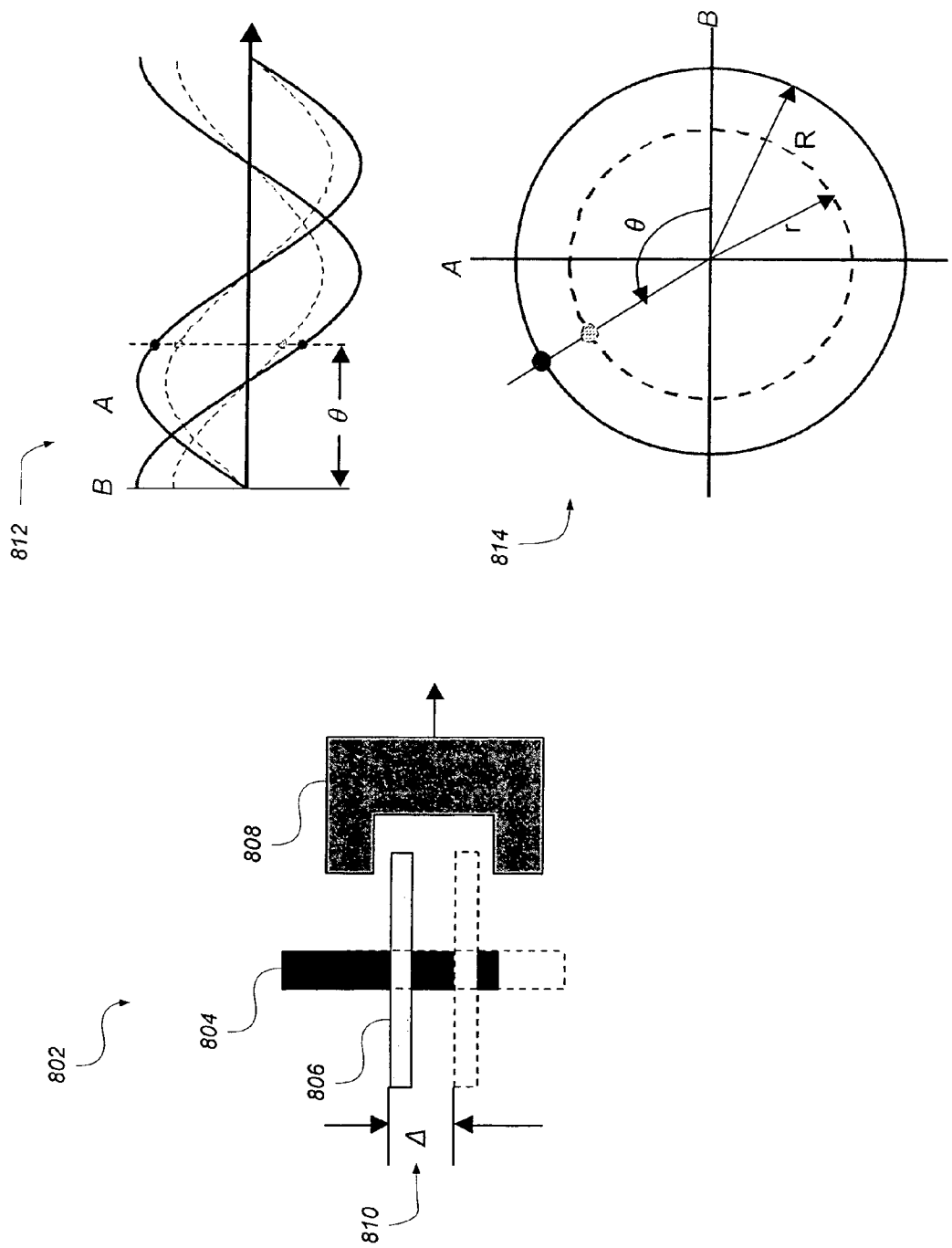
FIG. 8 is a diagram illustrating an embodiment for sensing a change in axial position in one embodiment of the present invention.

In one embodiment of the present invention, the axial position of the coding wheel may be determined. In such an embodiment, a push-to-select function 608 may be implemented without the addition of a switch in contact with the shaft. FIG. 8 is a diagram illustrating an embodiment for sensing a change in axial position in one embodiment of the present invention.

In the embodiment shown in FIG. 8, the knob assembly 802 comprises a shaft 804 connected to a coding wheel 806. The sensor 808 allows for axial movement of the coding wheel. The change in position is represented by $\Delta 810$. In one embodiment, up to 1.5 mm of axial travel is allowed without major degradation of the angular position/velocity signals.

Additionally, the axial motion produces amplitude modulation, offset and phase shifting on the resolver signals (A & B) 812. However the corresponding DAI position errors (mostly from phase shifting and zero-crossing offset) are not perceived in the haptics.

Axial position may also be determined as a deviation in phase trajectory amplitude from the reference phase trajectory 814. The approximation $\theta_{(3)}$ resulted in an aperture angle estimate that was independent of phase trajectory amplitude. As the encoder disk moves axially relative to the sensor, the amplitude, or distance from the centroid to the sample data pair (A,B) decreases with increasing distance from the disk to the sensor. In other words, the change in radius from r to R provides an indication that the user has moved the knob axially. This data value, which is independent of $\theta_{(3)}$ then can indicate to the processor the axial position of the encoder disk, which in the case of a haptic knob may indicate a push to select input from the user.

Phase trajectory amplitude may also be unique to an aperture, for examples a small aperture on the encoder disk may be used as an index aperture. The resulting phase trajectory will be uniquely correlated to the reference trajectory for the index aperture. The detection of the deviant aperture can be used to synchronize the aperture index. Synchronization of aperture index is critical to minimizing aperture error in the case of fine interpolation where a set of reference data is captured for each aperture in the disk, and the correlation of the sample data pair to only the relevant aperture is critical to maximizing accuracy.

General

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
receiving an analog sensor signal associated with a coding surface;
deriving a quadrature signal based at least in part on an analog threshold voltage associated with the analog sensor signal;

determining a velocity and a derived quadrature position of the coding surface based at least in part on the quadrature signal; and if the velocity exceeds a velocity threshold:
outputting the derived quadrature position of the coding surface;

otherwise:
determining an analog interpolated position based at least in part on the analog sensor signal,
determining a hybrid interpolated position based at least in part on the analog interpolated position and the derived quadrature position, and
outputting the hybrid interpolated position.

2. The method of claim 1, further comprising:
receiving a first waveform associated with a first aperture of the coding surface;
receiving a second waveform associated with a second aperture of the coding surface;
determining an average waveform associated with the first waveform and the second waveform.

3. The method of claim 1, further comprising outputting the hybrid interpolated position of the coding surface as user input to a device.

4. The method of claim 1, further comprising determining a haptic effect to be generated based at least in part on the hybrid interpolated position on the coding surface.

5. A system comprising:
a sensor configured to sense the motion of a coding surface;
a quadrature counter in communication with the sensor and operable to determine a quadrature position of the coding surface;
a processor in communication with the sensor and the quadrature counter, the processor operable to:
determine a velocity of the coding surface; and
if the velocity exceeds a velocity threshold,
output the quadrature position of the coding surface;
otherwise
determine analog interpolated position based at least in part on the analog sensor signal,
determine a hybrid interpolated position based at least in part on the analog interpolated position and the derived ciuadrature position, and
output the hybrid interpolated position.

6. The system of claim 5, further comprising a user input device in communication with the coding surface.

7. The system of claim 6, wherein the device comprises one of a phone, a PDA, a camera, an automotive entertainment system, or a DVD player.

8. The system of claim 5, wherein the hybrid interpolated position is associated with a position of a manipulandum.

9. The system of claim 8, wherein the manipulandum comprises a knob.

10. The system of claim 5, wherein the hybrid interpolated position comprises an angular position in a rotational degree of freedom.

11. The system of claim 5, wherein the hybrid interpolated position comprises a linear position in a linear degree of freedom.

12. The system of claim 5, further comprising a housing configured to house the processor, sensor, and quadrature counter.

13. A method comprising:
receiving a sensor signal;
determining at least two reference signals associated with the sensor signal, each of the at least two reference signals associated with a measured position;
calculating a measured signal trajectory angle associated with the sensor signal;
determining a stored signal trajectory angle associated with each of the at least two reference signals;
correlating the measured signal trajectory angle to the stored signal trajectory angle associated with each of the at least two reference signals to determine an interpolated position; and
outputting the interpolated position.

14. The method of claim 13, further comprising
receiving the at least two reference signals and the measured position; and
storing the at least two reference signals and the measured position.

15. The method of claim 13, wherein correlating the measured signal trajectory angle to the stored signal trajectory angle comprises applying a weighting function, the weighting function derived from a rate of change associated with the sensor value.

16. The method of claim 13, wherein correlating the measured signal trajectory angle to the stored signal trajectory angle comprises:
determining a point cloud including the at least two reference signals;
selecting at least one nearest neighbor from the point cloud, the selection comprising minimizing the least squared distance between the sensor signal and the at least one nearest neighbor.

17. The method of claim 13, further comprising:
minimizing the least squared error between the sensor signal and the at least one nearest neighbor.

18. The method of claim 13, further comprising:
detecting an index aperture based on a deviation in a phase trajectory of the sensor signal.

19. A method comprising:
receiving a sensor signal associated with a rotational position of a coding surface, the sensor signal having a first amplitude;
determining a reference signal based at least upon the sensor signal, the reference signal having a second amplitude;
determining an axial position of the coding surface based on the difference between the first amplitude and the second amplitude; and
outputting the axial position.

20. A computer-readable medium on which is encoded program code to cause a processor to execute a method comprising:
receiving an analog sensor signal associated with a coding surface;
deriving a quadrature signal based at least in part on an analog threshold voltage associated with the analog sensor signal;
determining a velocity and a derived quadrature position of the coding surface based at least in part on the quadrature signal;
if the velocity exceeds a velocity threshold:
outputting the derived quadrature position of the coding surface otherwise:
determining an analog interpolated position based at least in part on the analog sensor signal;
determining a hybrid interpolated position based at least in part on the analog interpolated position and the derived quadrature position; and
outputting the hybrid interpolated position.

21. The computer-readable medium of claim 20, wherein the executed method further comprises:

receiving a first waveform associated with a first aperture of the coding surface;
receiving a second waveform associated with a second aperture of the coding surface;
determining an average waveform associated with the first waveform and the second waveform.

22. The computer-readable medium of claim 20, wherein the executed method further comprises:
outputting the hybrid interpolated position of the coding surface as user input to a device.

23. The computer-readable medium of claim 20, wherein the executed method further comprises:
determining a haptic effect to be generated based at least in part on the hybrid interpolated position on the coding surface.

24. A computer-readable medium on which is encoded program code to cause a processor to execute a method comprising:
receiving a sensor signal;
determining at least two reference signals associated with the sensor signal, each of the at least two reference signals associated with a measured position;
calculating a measured signal trajectory angle associated with the sensor signal;
determining a stored signal trajectory angle associated with each of the at least two reference signals; and
correlating the measured signal trajectory angle to the stored signal trajectory angle associated with each of the at least two reference signals to determine an interpolated position.

25. A computer-readable medium on which is encoded program code to cause a processor to execute a method comprising:
receiving a sensor signal associated with a rotational position of a coding surface, the sensor signal having a first amplitude;
determining a reference signal based at least upon the sensor signal, the reference signal having a second amplitude;
determining an axial position of the coding surface based on the difference between the first amplitude and the second amplitude.

* * * * *

UNITED STATES PATENT AND TRADEMARK OFFICE
CERTIFICATE OF CORRECTION

PATENT NO.         : 7,386,415 B2
APPLICATION NO.    : 11/179067
DATED              : June 10, 2008
INVENTOR(S)        : Daniel H. Gomez, Danny Grant and Kollin M. Tierling Page 1 of 1

It is certified that error appears in the above-identified patent and that said Letters Patent is hereby corrected as shown below:

In Column 9, Line 26 the phrase $(A_{i\text{-}}, B_{i\text{-}1})$ should read --$(A_{i\text{-}1}, B_{i\text{-}1})$--

In Column 9, Line 26 the phrase "shortest distance vector," should read
--The reference data pair with the shortest distance vector--

In Column 11, Claim 5, Line 45, the word "ciuadrature" should read --quadrature--

Signed and Sealed this

Twenty-first Day of October, 2008

JON W. DUDAS
*Director of the United States Patent and Trademark Office*